May 3, 1960     F. BURKHARD ET AL     2,934,833
ENCIPHERING DEVICE

Filed Jan. 8, 1957     5 Sheets-Sheet 2

INVENTORS
FRANZ BURKHARD
KARL GUNDLFINGER and
WILLI VOLKHEIMER

By David M. Brandy
ATTORNEY

May 3, 1960   F. BURKHARD ET AL   2,934,833
ENCIPHERING DEVICE
Filed Jan. 8, 1957   5 Sheets-Sheet 3
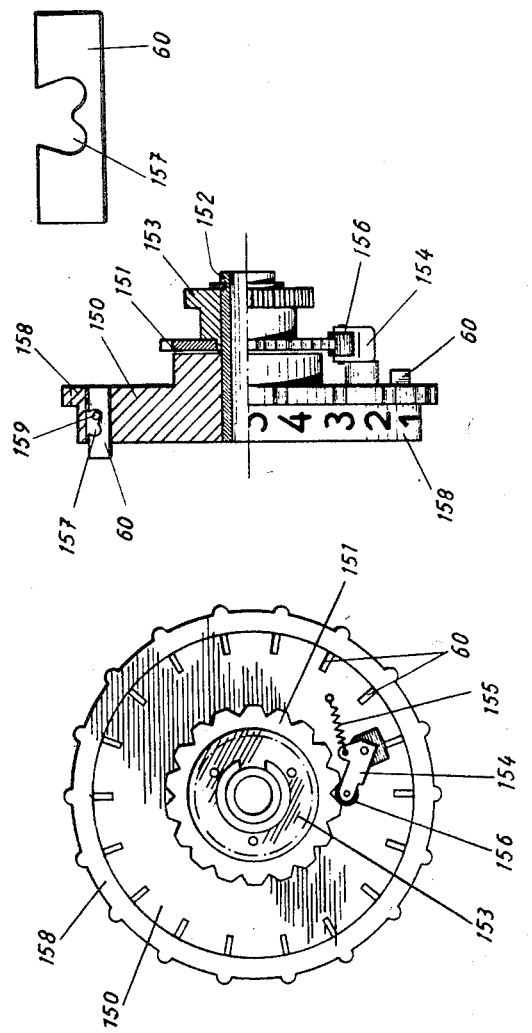
INVENTORS
FRANZ BURKHARD
KARL GUNDLFINGER and
WILLI VOLKHEIMER
BY David M. Brandy
ATTORNEY May 3, 1960 F. BURKHARD ET AL 2,934,833
ENCIPHERING DEVICE
Filed Jan. 8, 1957 5 Sheets-Sheet 5

INVENTORS
FRANZ BURKHARD
KARL GUNDLFINGER and
WILLI VOLKHEIMER
ATTORNEY

United States Patent Office 2,934,833
Patented May 3, 1960

2,934,833

ENCIPHERING DEVICE

Franz Burkhard, Frankfurt am Main, Eckenheim, Karl Gundlfinger, Frankfurt am Main, and Willi Volkheimer, Dieburg, Hessen, Germany, assignors to Telefonbau und Normalzeit G.m.b.H., Frankfurt am Main, Germany, a German joint-stock company Application January 8, 1957, Serial No. 633,135

14 Claims. (Cl. 35—4)

The invention relates to an inciphering device having rotatable contact means for interchanging electric current circuits corresponding to information to be enciphered, and relates more specifically to a device for rotating the contact means in a step-by-step manner by striking keys of a keyboard.

It is an object of the invention to provide an enciphering device of increased efficiency by such a construction of a drive for rotating the contact means in a step-by-step manner that, when using the same contact means, different enciphering periods may easily be obtained. It is, however, known to use rotatable discs which can be provided with a limited number of abutments, each abutment causing the stepping forward of one of the contact means, whereby to control the drive of the rotatable contact means.

It is another object of the invention to achieve a large number of different enciphering periods and to facilitate the setting of a desired enciphering period in that each slide of each disc is displaceable and separately and at will settable into an operative or a non-operative position on its disc and so arranged that only in its operative position it causes a rotation of the corresponding contact means when sensed by a sensing member. Each alteration of the position of the slide of a disc causes an alternation of the enciphering period of the current circuit allocated to information to be enciphered.

More specifically, the novel enciphering device may comprise a plurality of rotatable contact means, one of the rotatable contact means being allocated to each disc with its displaceable slides. Such a device enables the setting of a substantially greater number of enciphering periods without the necessity of removing parts from the device or inserting them into the device.

These and other objects and advantages of the invention will become apparent to those skilled in the art from the following detailed specification when read in conjunction with the appended drawings, which are given by way of example, and in which:

Fig. 1 diagrammatically illustrates an embodiment of the invention;

Fig. 3 is a plan view of one of the slide-carrying discs;

Fig. 4 is a side view, partly in section, of the disc of Fig. 3;

Fig. 5 illustrates a slide on a larger scale;

Figure 1:
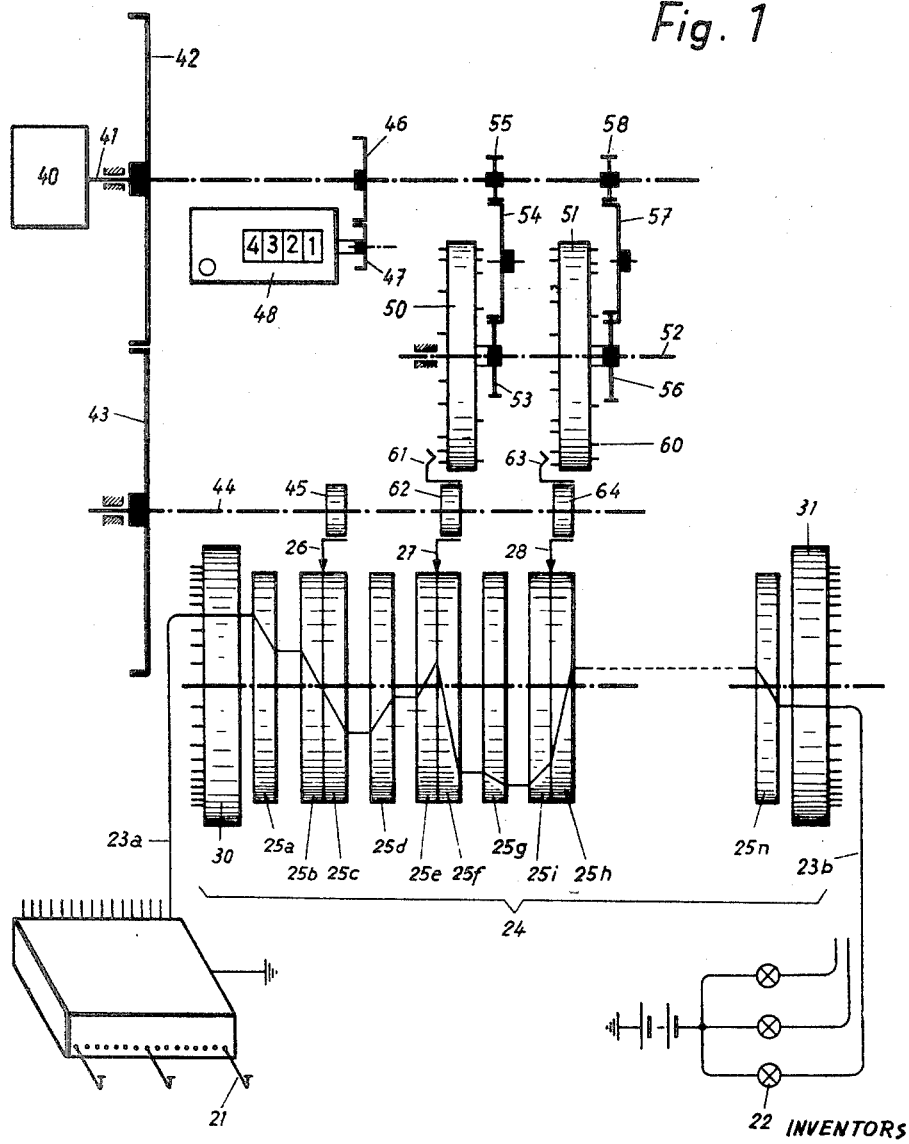

In the embodiment illustrated, a key 21 and a lamp 22 are allocated to each information, for example to each letter, to be enciphered. The keys 21 may be arranged in the manner of the keys of a typewriter. Preferably twenty six keys are provided corresponding to the twenty six letters of the alphabet. When operated, each key closes an electric circuit 23a, 23b for one of the lamps 22. This circuit extends across contact means of an interchanging arrangement generally indicated by reference numeral 24. The interchanging arrangement 24 comprises a plurality of disc-like contact means 25a to 25n which are all similarly constructed and of which some are permanently at rest and the others rotatable. In the embodiment illustrated, the contact means 25a, 25d, 25g and 25n are permanently at rest, while the contact means 25b and 25c are jointly rotatable. The drive for rotating this pair of contact means is diagrammatically indicated in Fig. 1 by an arrow 26. The contact means 25e and 25f are likewise jointly rotatable. The drive for this pair of contact means is indicated by an arrow 27. Also the contact means 25h and 25i are jointly rotatable, the drive for this pair of contact means being indicated by an arrow 28. Preferably, all the contact means 25a to 25n are easily exchangeable between two disc-like contact means 30 and 31, which are fixed in position and serve for supplying current. The contact means 30 and 31 and each of the exchangeable contact means 25a to 25n comprise a number of contacts corresponding to the number of keys 21. The contacts of the fixed contact means 30 are connected to contacts controlled by the keys 21 through the circuits 23a. The contacts of the fixed contact means 31 are connected to the lamps 22 through the circuits 23b. Within each of the exchangeable contact means 25a to 25n, (see Figs. 7 to 9), the contacts are arranged in two circles one on each side of the disc-like contact means and the contacts of one side are electrically connected to contacts at the other side according to a predetermined scheme. This scheme may be different for each of the exchangeable contact means 25a to 25n. After one of the keys 21 has been operated, the angular positions of the individual exchangeable contact means, thus, determines to which one of the lamps 22 the current circuit 23a, 23b is connected.

For rotating the rotatable contact means 25b, 25c; 25e 25f; 25i, 25h and so on, a drive 40 (diagrammatically shown in Fig. 1 and illustrated in greater detail in Fig. 2) is provided which on operation of one of the keys 21 rotates a shaft 41 in known manner about an angle, the value of which is always the same. Through gears 42 and 43, a shaft 44 is coupled to the shaft 41. The shaft 44 carries a wheel 45 which at each step of rotation controls the drive 26 for the pair of contact means 25b and 25c. Thus, this pair of contact means 25b and 25c is rotated through one step on an operation of a key 21.

By means of gears 46 and 47, a counting device 48 is stepped forward by one step on each rotation of the shaft 41 through the same angle. The counting device 48 thus indicates the number of operations of the keys 21.

The drive of the pair of rotatable contact means 25e and 25f is dependent on a slide-carrying disc 50, and the drive of the pair of rotatable contact means 25h and 25i is dependent on a slide-carrying disc 51. Both discs 50 and 51 idle on a shaft 52. The disc 50 is connected to a toothed driving wheel 53 which is rotatable in a step-by-step manner by a toothed wheel 55 on the shaft 41 through an intermediate pinion 54. In a corresponding manner the disc 51 is connected to a toothed driving wheel 56 which is rotatable in a step-by-step manner by a toothed wheel 58 on the shaft 41 through an intermediate pinion 57. The discs 50 and 51 are provided with different numbers of slides. The driving wheels 53 and 56 and the intermediate pinions 54 and 57 are so dimensioned that for the same step-by-step rotation of the shaft 41 through the same angular amount each of the discs 50 and 51 is rotated through one step.

The slides 60 of the slide-carrying discs 50 and 51 (see Figs. 3, 4 and 5) are manually displaceable in the axial direction of the discs so that they protrude either at one or the other side of the respective disc. The slides protruding at one side (the left-hand side in Figs. 1 and 4) of the disc 50 are sensed by a sensing member 61. When the sensing member 61 engages one of the slides then it renders the corresponding drive 27 of the pair of rotatable contact means 25e and 25f operative so that this drive under the action of a cam 62 rotates the pair of contact means 25e and 25f through one step on rotation of the shaft 44. In a corresponding manner, the sensing member 63 senses the slides protruding from the slide-carrying disc 52 at one side (the left-hand side of Figs. 1 and 4) and causes the drive 28 to be rendered operative so that this drive under the action of a cam 64 rotates the pair of contact means 25h and 25i through one step on rotation of the shaft 44.

The setting of the slides 60 on the discs 50 and 51, thus, determines the rotation of the corresponding pair of rotatable contact means when a key 21 is operated. Since the two discs 50, 51 have different numbers of slides, the product of the numbers of their slides determines the length of the enciphering period. Preferably, the number of displaceable slides of each slide-carrying disc is a prime number.

Figure 2:
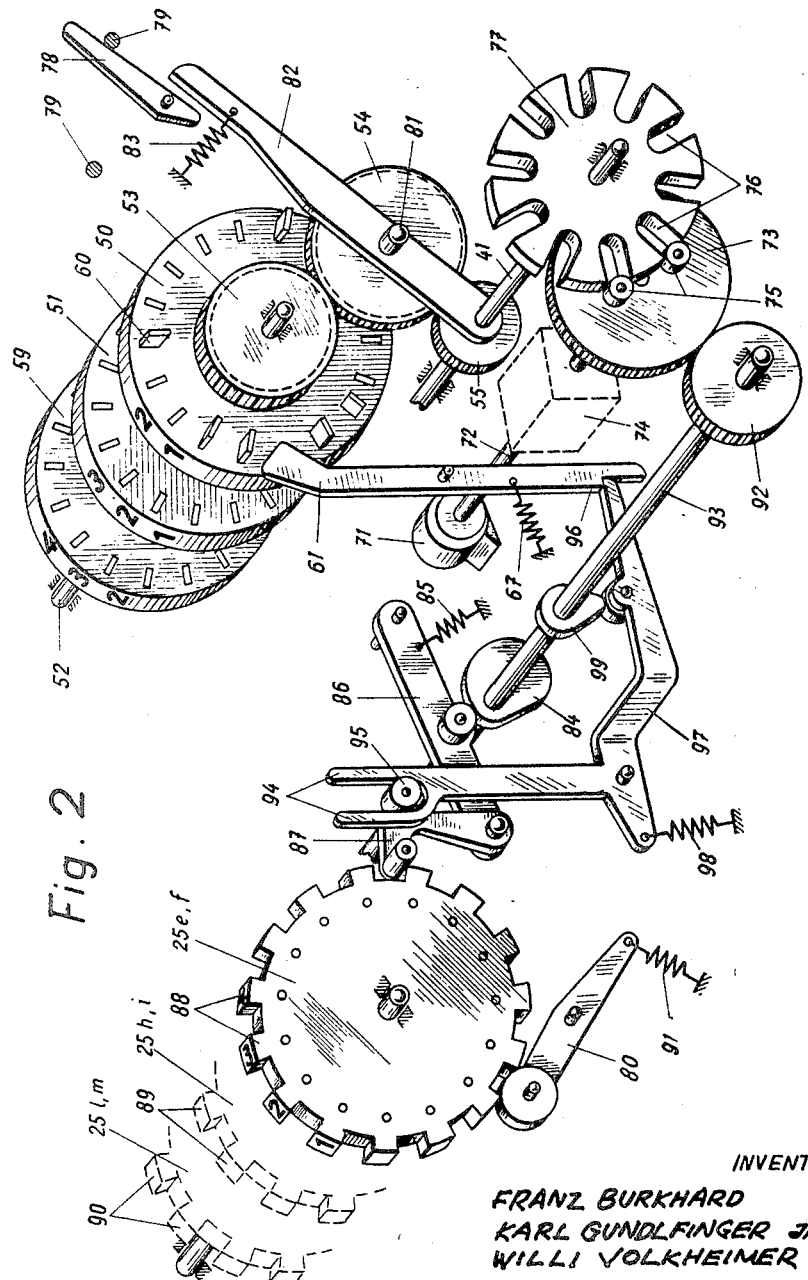
Fig. 2 is a perspective view of a stepping mechanism for contact means and slide-carrying discs of the embodiment.

Referring now to Fig. 2, there is illustrated a shaft 72 which is continuously rotatable by a motor 71. The shaft 72 drives a wheel 73 by means of a clutch 74 which is shown only diagrammatically. The clutch 74 is operated on each operation of a key 21 in the manner illustrated in Fig. 6. On each operation, the clutch 74 couples the driving wheel 73 to the shaft 72 for half a revolution of this shaft.

The wheel 73 carries two gear pins 75 which cooperate with recesses 76 of a Maltese wheel 77 keyed to the shaft 41. On each rotation of the wheel 73 through an angle of 180° the Maltese wheel 77 is rotated through one tooth division. On the shaft 41 of the Maltese wheel 77, the toothed wheels 46, 55 and 58 (Fig. 1) are provided, of which in Fig. 2 only the toothed wheel 55 is illustrated. The toothed wheel 55 meshes with the intermediate pinion 54, the shaft 81 of which is mounted on a lever 82 rotatable about the shaft 41, the said lever being under the action of a spring 83. The spring 83 urges the lever 82 into a position in which the intermediate pinion 54 meshes with the driving wheel 53 of the corresponding disc 50. By a handle 78 rotatable between two stops 79, the lever 82 together with the intermediate pinions 54 and 57 can be turned against the action of the spring 83 so that the slide-carrying discs 50 and 51 and a further slide-carrying disc 59 are then freely rotatable about the shaft 52. The three discs 50, 51 and 59 idle on the shaft 52. Each of the discs carries a number of slides 60 which are displaceable in the axial direction, and the positions of which are sensed by the sensing member 61. Since the discs 50, 51 and 59 are provided with different numbers of slides 60, the numbers of teeth of the pinion 54 and driving wheel 53 and those of the corresponding pinion 57 and driving wheel 56 of Fig. 1, which latter are not reproduced in Fig. 2 and which are allocated to the disc 51, as well as those of the corresponding pinion and driving wheel for the disc 59 are so selected on each rotation of the Maltese wheel 77 through one step under the influence of a half-revolution of the wheel 73, each of the slide-carrying discs 50, 51 and 59 is rotated through one slide division, that is to say through the angle between adjacent slides. Preferably, the discs 50, 51 and 59 are of the same diameter as shown in Fig. 2 notwithstanding the different numbers of slides.

The wheel 73, which one each operation of the clutch 74 performs half a revolution, meshes with a gear wheel 92 on a shaft 93, the gearing of the wheels 73 and 92 being so selected that the shaft 93 performs a complete revolution on each half-revolution of the wheel 73. Two cams 84 and 99 on the shaft 93 are allocated to each of the pair of contact means 25e, 25f; 25h, 25i; and 25l, 25m. The cam 84 acts on a push member 87 mounted on a single-arm lever 86 which is under the influence of a return spring 85. The push member 87 cooperates with teeth 88 of the pair of contact means 25e, 25f. In Fig. 2, the contact means and their driving teeth 88, 89 and 90 are indicated only diagrammatically. A locking lever 80 under the action of a spring 91 engages the teeth of the contact means. For clarity's sake, only the parts for the drive of the contact means 25e and 25f are illustrated in Fig. 2.

The engagement of the push member 87 into the teeth 88 of the contact means 25e and 25f is dependent on a lever 97 which is under the action of a spring 98. The end 94 of one arm of the lever 97 is forked and straddles a projection 95 of the push member 87, and retains the same in the position illustrated in which it is out of engagement with the teeth 88 of the contact means 25e, 25f. The spring 98, however, tends to rotate the push member 87 in anti-clockwise direction and thereby to urge the push member 87 into engagement with the teeth 88. Rotation of the lever 97 is prevented by a shoulder 96 of the sensing member 61 against which the other arm (the right-hand arm in Fig. 2) of the lever 97 abuts.

In the position illustrated in Fig. 2, the sensing member 61 is, under the action of its spring 67, held in the position in which the shoulder 96 locks the lever 97. When, on rotation of the disc 50, a slide 60 that is in its operative position engages underneath the free end of the sensing member 61, then the sensing member is turned in anti-clockwise direction against the action of its spring 67 so that the shoulder 96 disengages the lever 97. As soon as the shaft 93 starts rotating, the cam 99 temporarily releases the lever 97. The lever 97 is turned under the action of its spring 98, and the forked lever end 94 presses the push member 87 into engagement with the teeth 88. During the movement which the push member 87 now performs under the action of the cam 84, the pair of contact means 25e and 25f is rotated through one step. Towards the end of rotation of the shaft 93, the cam 99 rotates the lever against the action of the spring 98 so that the shoulder 96 of the sensing member 61 can re-engage the free end of the lever 97 when the sensing member 61 is turned by the spring 67 into the position illustrated.

By the two-pin gear formed by the disc 73, the two pins 75, the Maltese wheel 77 and its recesses 76, all the discs 50, 51 and 59 are simultaneously rotated through one slide division. All the sensing members 61 simultaneously test the position of one slide of each of the three slide-carrying discs. According to the result of this testing, each sensing member either releases the corresponding lever 97 or continues to lock the same. A released lever 97 causes the corresponding push member 87 to engage the teeth of the corresponding contact means. By the cams 84 on the shaft 93 the push members 87 of all the contact means 25e, 25f; 25h, 25i; and 25l, 25m are rotated simultaneously. The push members which are in engagement with the teeth of their respective contact means carry the same with them and rotate the same simultaneously each through one step. The cams 84 are so constructed that the movement of the contact means is effected first with a constant acceleration to a maximum value and subsequently with a constant deceleration until rest so as to avoid jerking.

As shown in Figs. 3 and 4, the driving wheel 153 is not rigidly connected to the corresponding slide-carrying disc 150. The driving wheel 153 together with a ratchet wheel 151 idles on a bush 152 of the disc 150. On the disc 150, a pawl 154 is pivoted and is under the action of a spring 155. A roller 156 of the pawl 154 thereby engages the ratchet wheel 151 and couples the disc 150 in the direction of rotation to the driving wheel 153. The intermediate pinion 54 (Fig. 2) which couples the driving wheel 153 to the toothed wheel 55 is, in the embodiment of Figs. 3 and 4, arranged on a shaft therefor fixed in position (contrary to the arrangement of Fig. 2) and is thus in permanent engagement with the driving wheel 153. For a displacement into a desired initial position, the disc 150 can be rotated, while overcoming the spring 155 of the pawl 154, relatively to the driving wheel 153 without the necessity of interrupting the engagement of the intermediate pinion 54. Since, while at rest, the two pins lock the Maltese wheel 77 against rotation, the manual rotation of the disc 150 cannot have any effect on the other slide carrying discs or on the driving mechanism of the contact means.

The disc 150 illustrated in Figs. 3 and 4 has radial slots 157 at its circumference. These slots are closed by a ring 158. Plate-like slides 60 (see Fig. 5) are inserted into the slots 157 on the slides and have a somewhat heart-shaped recess. The shape of the recess forms two end positions for an endless helical spring 159 bent into a ring and lying in a circumferential groove of the disc 150.

The ring 158, which closes the slots, is snugly seated under friction on the disc 150. At its outer circumference it carries the denomination of the individual slides. The ring 158 (Figs. 3 and 4) is suitably shaped for manual operation and is well adapted for rotating the disc 150 manually.

Figure 6:
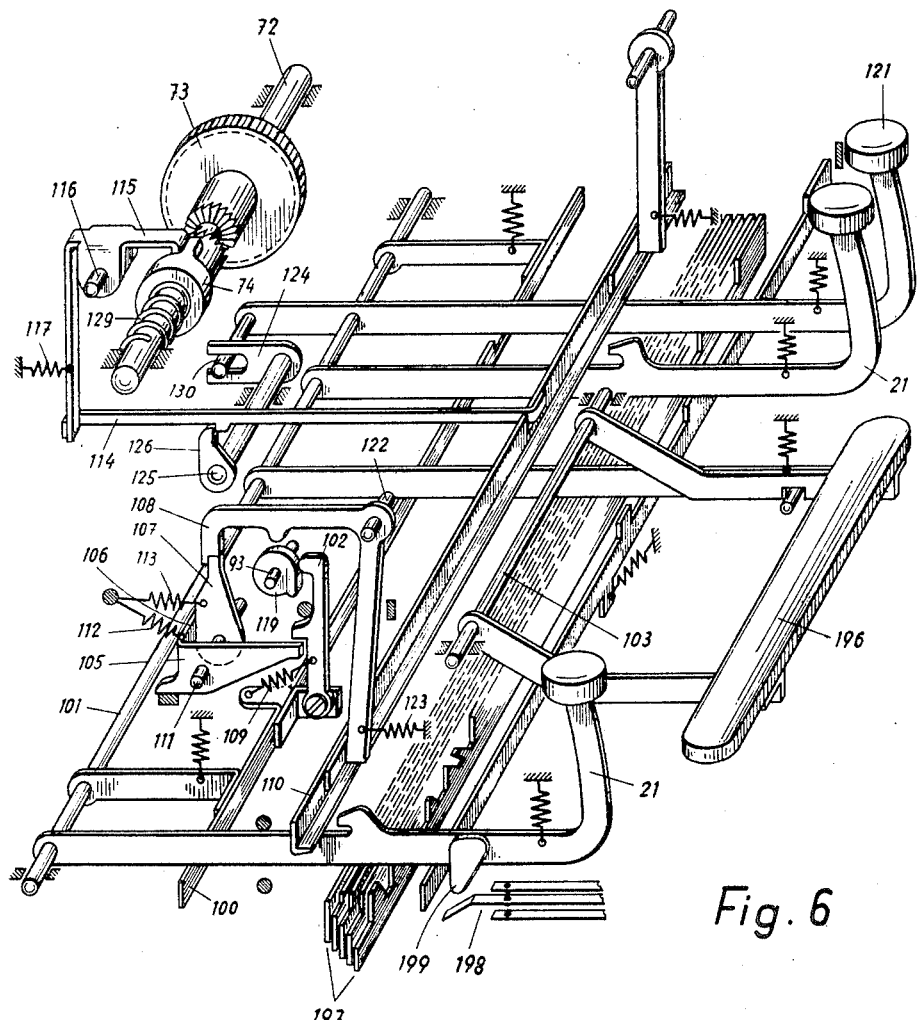
Fig. 6 is a perspective view of a key-board of the embodiment with means for controlling a clutch.

The keys 21 of the key-board (see Fig. 6) are rotatably mounted on a shaft 101 and a space bar 196 is rotatably mounted on a shaft 103. To each key 21 a switch-over contact 198 is allocated, which is operated by a projection 199 when the key is depressed and which closes the electric circuit 23a (Fig. 1) allocated to the key. Transversely of the keys, combination bars 197 are displaceably mounted which in known manner are provided with inclined teeth so that they are displaced on each operation of a key into a position corresponding to a five-unit code. These keys serve, in the manner usual in connection with teleprinting machines, for determining a code combination corresponding to the letter or the like represented by the key operated and which may be used for transmitting telegraphic signals or for controlling a printing mechanism. Underneath all the keys, there is further provided a release bar 100 which likewise is mounted rotatably about the shaft 101. To the release bar 100 a pawl 102 is rotatably linked which is under the action of a spring 109. On depressing one of the keys 21 or the space bar 196, the release bar 100 is turned and the pawl 102 is moved downwards. The pawl 102 acts on a lever 105 rotatably mounted on a shaft 111 and acts through a lug 106 on a supporting pawl 107 which also is rotatably mounted on the shaft 111. Against the supporting pawl 107 bears a lever 108 mounted rotatably about a shaft 122 and carrying a rail 110. When on operation of one of the keys 21 and 196, the lever 105 is turned under the action of the pawl 102, then the supporting pawl 107 is removed from under the lever 108 which then rotates in anti-clockwise direction under the influence of a spring 123 when viewed as shown in Fig. 6. The rail 110 transfers this movement by means of a pull rod 114 to a pawl 115 rotatably mounted on a shaft 116. The pawl 115 releases the clutch 74 which rotates together with the driving shaft 72 but is axially displaceable on the shaft 72 and is under the action of a spring 129 so that the wheel 73 of the two-pin gear is coupled to the permanently rotating shaft 72. On the control shaft 93 (Fig. 2), a cam 119 is provided. When the said control shaft rotates, the cam 119 first rotates the pawl 102 so that the said pawl releases the lever 105. Under the influence of a spring 112, the lever 105 returns into its position of rest illustrated and releases the supporting pawl 107. Subsequently, the cam 119 on further rotation lifts the lever 108 so that the supporting pawl 107 is released and can assume the position illustrated under the action of its spring 113. Simultaneously, the pull rod 114 releases the pawl 115 so that the same returns into its position of rest under the influence of a spring 117, in which the pawl 115 arrests the coupling 74 at the end of a half-revolution of the control shaft 72 and, owing to the conical construction of its sides displaces the coupling 74 against the spring 129 along the shaft 72. Thus, in each case the wheel 73 performs a half-revolution and, owing to the gear ratio of the wheels 73 and 92 (Fig. 2), the control shaft 93 performs in each case a complete revolution, no matter for how long one of the keys 21 or the space bar 196 is depressed. If during the rotation of the wheel 73 and the control shaft 93 caused by the depression of one of the keys this key is released and a further key is depressed, then the pawl 115 is again preparatorily lifted so that the control shaft 93 can perform a second revolution immediately following the first revolution. Thereby, the effect caused by the second key is stored by the lever 108 which only after the beginning of the second revolution of the control shaft 93 is returned by the cam 119.

In addition to the keys 21, a further key 121 is provided which when depressed turns, by means of a pin 130, a fork 124 which through a shaft 125 is connected to a pawl 126. The pawl 126 engages the pull rod 114 by means of an extension 127. So long as the key 121 is depressed, the pawl 115 is lifted by the pull rod 114 so that the control shaft 93 rotates permanently. This is advantageous for performing testing.

Figure 7:
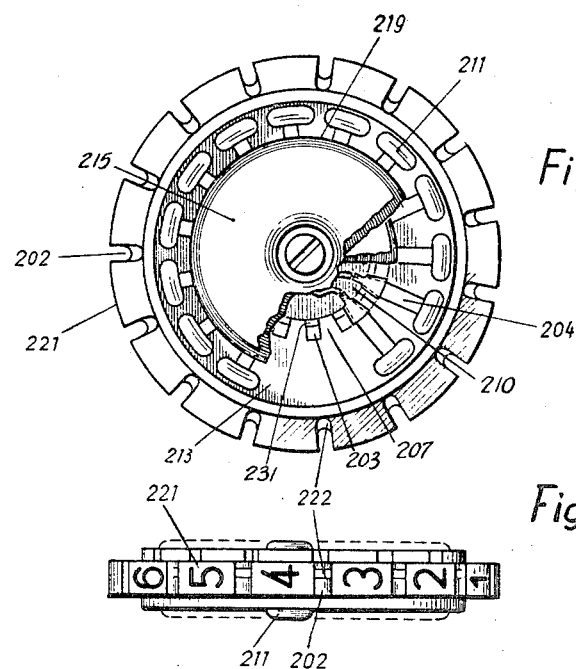
Fig. 7 is a plan view of a contact means of the embodiment.
Figure 8:
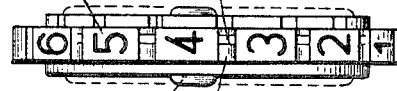
Fig. 8 is a side view of the contact means of Fig. 7.
Figure 9:
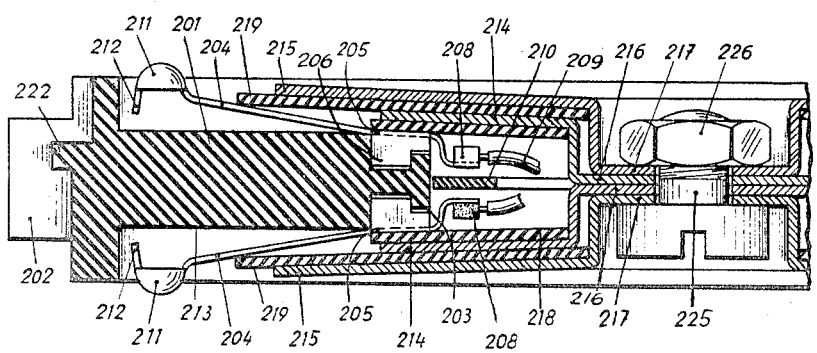
Fig. 9 is a sectional view of the contact means of Figs. 7 and 8 on a larger scale.

The contact means illustrated in Figs. 7 to 9 comprises an annular carrying body 201 of insulating material. The outer circumference of the carrying body 201 is formed to provide indication fields 221 between which grooves 202 are provided which extend parallel to the axis. Into the grooves, projections 222 of the carrying body 201 extend and cause the contact means to be non-symmetric relatively to its centre plane. The projections 222 render it possible that the contact means are inserted into correspondingly constructed holding devices always in the same position relative to the plane of symmetry.

At its inner circumference, the annular carrying body 201 has radial slots 203 between which saddle-like projections 207 remain which have conically extending lateral surfaces. The projections 207 serve for holding contact springs 204. The radial slots 203 are of different depths and are terminated, towards the central opening in the annular carrying body 201, by raised portions 231 in the walls defining the slots.

The contact springs 204 are arranged radially on the carrying body 201. The inner end 205 of each contact spring has lateral projections 206 bent in the shape of a U enclosing the saddle-like projections 207. The lateral projections 206 are formed to correspond to the cross-section of each slot 203 (Fig. 9). By this shaping, the contact springs 204 are secured against radial displacement. In the longitudinal direction, each contact spring 204 terminates in an extension 208 which is constructed as a soldering lug for a wire 209.

Against the contact springs 204 positioned on the projections 207 bears an annular insulating disc 218 which is pressed against the contact springs 204 by a clamping disc 214. The centre part of the clamping disc 214 is bent to form an eye 216. On each clamping disc 214 lies a further insulating ring 219 which, owing to its outer width, screens the contact springs 204 until close to their outer ends. The further insulating ring 219 is held by a further clamping disc 215, the centre portion of which is formed into an eye 217. The eyes 216 and 217 are dished and tightly pressed towards each other by a screw 225 and nut 226. Thereby, the contact springs 204 are fixedly held on the carrying body 201.

One end of each contact spring 204 is formed into a cap-like contact element 211 carrying an extension 212. On axial pressure being exerted against the contact elements 211, the extensions 212 support the contact springs 204 by bearing against the lateral surfaces 213 of the carrying body 201. The cap-like construction of the contact elements 211 prevents the contact springs 204 from becoming stuck when sliding a contact means into a chamber carrying a fixed contact member or when a plurality of contact means are rotated relatively to each other.

The wire 209 soldered to the extension 208 of each contact spring 204 connects the contact spring arranged at one side of the carrying body 201 to another contact spring arranged at the other side of the said carrying body. This wiring is effected by means of individual insulated wires. Between the extensions 208 of both rows of contact springs lies a ring 210 of insulating material in order to prevent a direct contact between oppositely arranged extensions 208.

By pressing together the clamping discs 214 and 215 by means of the screw and nut connection, which is arranged co-axially of each contact means, the contact springs 204 are pressed against the saddle-like projections 207. Since in doing this the clamping discs 214 and 215 are slightly bent, the surface of each projection 207 and the corresponding part 205 of the contact spring 204 are preferably slightly conical relatively to the axis of the contact means. The use of two clamping discs has the advantage that the contact springs 204 are protected against mechanical contact except near the contact element 211. The outer diameter of the insulating discs 219 is greater than that of the clamping disc 215 in order to prevent any direct contact between the contact spring and the clamping disc 215.

The annular carrying body 201 is preferably manufactured from insulating material in a pressing or injection moulding process. The ring 210, the insulating disc 218 and the insulating ring 219 as well as the clamping discs 214 and 215 and the contact springs 204 may be formed by punching and bending.

From the foregoing and in particular from a consideration of Fig. 1 it will be seen that one of a plurality of the lamps 22 is illuminated on each depression of one of the keys 21. Which particular lamp is illuminated in each case depends on the particular key depressed, on the wiring within each of the contact means 30, 25a ... 25n, 31 and on the rotation imparted to the rotatable contact means 25b, 25c, 25e, 25f, 25i, 25h; such rotation depends, in turn, on the setting of the slides 60 on the discs 50 and 51. When each of the keys 21 and each of the lamps 22 correspond to letters, it will be seen that by typing a message on the keys 21 and noting the letters corresponding to the lamps 22 illuminated in each case, the letters so noted represent the message in enciphered shape. It will further be seen that by manually altering the setting of the slides 60 the code underlying the enciphering process may easily be changed.

Of course, the mode of use of the arrangement may be reversed, that is to say, by a suitable choice of setting of the discs 60 and of the wiring in the contact means 30, 25a ... 25n, 31 it can be achieved that when an enciphered text is typed by means of the keys 21, then the illumination of the lamps 22 may be caused to indicate the original message, which otherwise would be difficult to restore from the enciphered text since, owing to the rotation of the rotatable discs 25b, 25c, 25e, 25f, and 25i, 25h, the correlation between the keys 21 and the lamps 22 is altered on each operation of one of the keys 21.

It should be clearly understood that the embodiment described is given by way of example only and that many modifications, omissions and additions are possible without departing from the scope and spirit of the present invention.

What we claim is:

1. In and for an enciphering device, a plurality of electric current transmitting means, a plurality of rotatable contact means arranged for connecting some of said electric current transmitting means to establish an electric current circuit corresponding to information to be enciphered, a plurality of drives each for rotating one of the said contact means to vary the connection of electric current transmitting means, a plurality of discs rotatable in a step-by-step manner, a plurality of keys each for causing a rotation of at least one of said discs through at least one step, a number of slides carried by each of said discs, each slide of each disc being manually displaceable relatively to its disc and being at will alternatively settable into an operative position and into a non-operative position on its disc, a sensing member for each disc, each sensing member being arranged for sensing the slides of its disc, the said drives being actutable by said sensing members, the arrangement being such that a slide causes a rotation of a contact means by means of the sensing member of its disc and drive only when the respective slide is in its operative position.

2. A device as claimed in claim 1, wherein each disc has slots at its circumference in which the slides in the shape of plates are arranged so that each slide is displaceable into two different end positions in which it protrudes alternately at one or the other side of the disc, said end positions of each slide corresponding to its operative and non-operative positions.

3. A device as claimed in claim 1, wherein different discs are differently sub-divided and carry different numbers of slides.

4. A device as claimed in claim 1, and comprising a two-pin gear for driving the discs, the two-pin gear being common to all the dics, a plurality of intermediate gears, one for each disc, the gear ratio of a particular intermediate gear corresponding to the number of slides carried by the respective disc, a driving motor, and a clutch operatively arranged between the said driving motor and the said two-pin gear, the said clutch, on each operation of a key, coupling the two-pin gear to the driving motor for a constant angle of rotation.

5. A device as claimed in claim 4, and comprising a first shaft rotatable by the two-pin gear, a plurality of toothed wheels, each forming part of one of the intermediate gears, the toothed wheels being keyed to said first shaft, and a plurality of pinions, each meshing with one of said toothed wheels, a second shaft, the pinions being mounted on said second shaft, a traverse carrying said second shaft, and being rotatable about said first shaft.

6. A device as claimed in claim 5, and comprising a plurality of gear wheels, each associated with one of the discs and meshing with one of the pinions, a spring-loaded pawl on each disc, a ratchet wheel connected to each gear wheel and cooperating with said pawl whereby to enable a manual rotation of the disc relative to the respective gear wheel.

7. A device as claimed in claim 4, and comprising a toothed wheel forming part of the two-pin gear and being driven by the clutch, on its operation, through a constant angle of rotation, another toothed wheel, a control shaft, a plurality of cams, and a plurality of push members, the first mentioned toothed wheel meshing with the other toothed wheel which is keyed to the control shaft which carries the said cams for controlling the movement of the contact means by the said push members.

8. A device as claimed in claim 7, wherein each cam of the control shaft is of such a shape that each push member displaces its contact means with a uniform acceleration and a uniform deceleration.

9. A device as claimed in claim 7, wherein the two toothed wheels are so constructed that the control shaft performs a complete revolution on each half-revolution of the two-pin gear.

10. A device as claimed in claim 7, and comprising a movable rail, a pawl on said rail, a spring-loaded intermediate mechanism, and a release mechanism forming part of the clutch, the said rail being operable by any one of the keys, the said intermediate mechanism being separately movable and operable by the said pawl, the clutch on each operation coupling the two-pin gear to the driving motor for a half-revolution, and the said release mechanism being temporarily actuatable by the said intermediate mechanism.

11. A device as claimed in claim 10, and comprising a locking member, the release mechanism being spring-loaded and co-operating with the said locking member which is temporarily movable for release by the pawl.

12. A device as claimed in claim 11, and comprising a further rotatable cam on the control shaft and allocated to the pawl of the rail, and another pawl forming part of the intermediate mechanism, the said cam being arranged for moving the pawls against the action of their springs into preparatory positions.

13. A device as claimed in claim 12, wherein the locking member comprises two separately rotatable parts each of which is spring-loaded and which are dependent on each other in one direction of movement.

14. A device as claimed in claim 13, wherein the release mechanism comprises a further pawl and a spring, the further pawl locking the clutch under the action of the said spring, an operating member, a stronger spring, and a member intermediate the release mechanism and the locking member, the said operating member being under the action of the said stronger spring and, in the position of rest, being locked to the said intermediate member by means of said other pawl.

References Cited in the file of this patent

UNITED STATES PATENTS

| | | |
|---|---|---|
| 2,402,182 | Rosen | June 18, 1946 |
| 2,753,034 | Hell | July 3, 1956 |
| 2,765,364 | Hagelin | Oct. 2, 1956 |